US011773959B2

(12) United States Patent
Takeda et al.

(10) Patent No.: US 11,773,959 B2
(45) Date of Patent: Oct. 3, 2023

(54) DRIVING FORCE TRANSMITTING DEVICE

(71) Applicants: TOYOTA JIDOSHA KABUSHIKI KAISHA, Toyota (JP); AISIN CORPORATION, Kariya (JP)

(72) Inventors: Hiroki Takeda, Toyota (JP); Akihiro Makino, Toyota (JP); Isao Sato, Nagoya (JP); Haruhisa Suzuki, Miyoshi (JP); Yoshiteru Hagino, Nisshin (JP); Koichi Hasegawa, Nagoya (JP); Yasuaki Tahara, Kariya (JP); Masahiko Kanamaru, Kariya (JP); Jo Torii, Kariya (JP); Takeshi Torii, Kariya (JP); Tokiyoshi Kida, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 17/929,098

(22) Filed: Sep. 1, 2022

(65) Prior Publication Data

US 2023/0092217 A1    Mar. 23, 2023

(30) Foreign Application Priority Data

Sep. 17, 2021   (JP) .................................. 2021-151914

(51) Int. Cl.
*F16H 57/04*   (2010.01)
*F16H 57/021*   (2012.01)
(Continued)

(52) U.S. Cl.
CPC ......... *F16H 57/0424* (2013.01); *F16H 3/091* (2013.01); *F16H 57/021* (2013.01); *F16H 2057/02034* (2013.01)

(58) Field of Classification Search
CPC ............... F16H 57/0424; F16H 57/021; F16H 2057/02034; F16H 3/091
See application file for complete search history.

(56) References Cited

U.S. PATENT DOCUMENTS 9,850,999 B2 * 12/2017 Tahara .................. F16H 57/045
11,168,783 B1 * 11/2021 Cradit ................. F16H 57/0457
(Continued)

FOREIGN PATENT DOCUMENTS

JP    2016-89860 A    5/2016
JP    2018-105419 A   7/2018

*Primary Examiner* — Jake Cook
(74) *Attorney, Agent, or Firm* — Oblon, McClelland, Maier & Neustadt, L.L.P.

(57) ABSTRACT

A driving force transmitting device includes a case, an electric motor, and a gearbox. The electric motor includes an output shaft. The gearbox includes a spur gear that rotates coaxially with the output shaft. The case includes a partition wall, a first accommodating chamber accommodating the electric motor, and a second accommodating chamber that accommodates a second driven gear. The partition separates the first accommodating chamber and the second accommodating chamber from each other. The partition wall includes a connecting hole that connects the first accommodating chamber and the second accommodating chamber to each other. The connecting hole is located on one direction side in relation to the central axis of the output shaft. At least part of the connecting hole overlaps with the spur gear when viewed in a direction along the central axis.

4 Claims, 3 Drawing Sheets

(51) Int. Cl.
*F16H 3/091* (2006.01)
*F16H 57/02* (2012.01)

(56) References Cited

U.S. PATENT DOCUMENTS

2016/0123454 A1   5/2016  Tahara et al.
2016/0186854 A1*  6/2016  Tahara ................ F16H 57/0424
                                                     74/468
2018/0180164 A1   6/2018  Hagino

* cited by examiner

DRIVING FORCE TRANSMITTING DEVICE

BACKGROUND

1. Field

The present disclosure relates to a driving force transmitting device.

2. Description of Related Art

Japanese Laid-Open Patent Publication No. 2016-089860 discloses a driving force transmitting device that includes a case, an electric motor located in the case, and a gearbox located in the case. The electric motor includes an output shaft. The gearbox is a gear mechanism including gears. At least one of the gears in the gearbox rotates coaxially with a central axis of the output shaft. The case includes a first accommodating chamber, which accommodates the electric motor, a second accommodating chamber, which accommodates part of the gears of the gearbox, and a catch tank, which connects the first accommodating chamber and the second accommodating chamber to each other. The catch tank is located above the output shaft.

When the gears of the gearbox rotate in the second accommodating chamber, oil in the second accommodating chamber is raised. The raised oil flows into the catch tank. The oil that has flowed into the catch tank then flows into the first accommodating chamber and other lubricant oil passages.

The driving force transmitting device as disclosed in Japanese Laid-Open Patent Publication No. 2016-089860 supplies oil to the first accommodating chamber when the electric motor rotates. An increase in the number of rotations of the electric motor increases the amount of oil raised in the second accommodating chamber. This increases the amount of oil flowing into the first accommodating chamber via the catch tank. If the amount of oil that flows from the first accommodating chamber into the second accommodating chamber is less than the amount of oil flowing into the first accommodating chamber, the oil stagnates in the first accommodating chamber.

When oil stagnates in the first accommodating chamber as described above, the oil level in the first accommodating chamber rises. If the oil level in the first accommodating chamber rises excessively, the rotor will be partly put in the oil. The oil may then resist rotation of the rotor or cause the rotor to be damaged.

The above-described example relates to a case in which oil is returned to the first accommodating chamber from the second accommodating chamber via the catch tank. However, similar drawbacks are present in any type of driving force transmitting device in which oil is circulated from a second accommodating chamber to a first accommodating chamber when gears of a gearbox rotate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a driving force transmitting device includes a case, an electric motor that is located in the case and includes an output shaft, and a gearbox that is located in the case and configured to change a rotation speed of the output shaft. The gearbox includes gears, one of which is a spur gear. The spur gear rotates coaxially with the output shaft. The case includes a first accommodating chamber, a second accommodating chamber, a partition wall, and a return passage. The first accommodating chamber accommodates the electric motor. The second accommodating chamber accommodates the spur gear. The first accommodating chamber and the second accommodating chamber are arranged in a direction along a central axis of the output shaft. The partition wall separates the first accommodating chamber and the second accommodating chamber from each other. An axis that is orthogonal to the central axis is referred to as an orthogonal axis. One of two directions along the orthogonal axis is referred to as a first direction, and a direction opposite to the first direction is referred to as a second direction. At least part of the return passage is located on the first direction side in relation to the central axis. The return passage is connected to both of the first accommodating chamber and the second accommodating chamber. The partition wall includes a connecting hole that connects the first accommodating chamber and the second accommodating chamber to each other. The connecting hole is located on the second direction side in relation to the central axis. At least part of the connecting hole overlaps with the spur gear when viewed in a direction along the central axis.

The above-described configuration allows the oil in the first accommodating chamber to flow into the second accommodating chamber through the connecting hole. When rotating, the spur gear raises oil in the vicinity of the spur gear. Accordingly, oil is likely to be drawn toward the spur gear in the area surrounding the outer periphery of the spur gear. This allows the oil in the first accommodating chamber to readily flow into the second accommodating chamber through the connecting hole. That is, the above-described configuration restricts oil from stagnating in the first accommodating chamber. Thus, the oil level in the first accommodating chamber hardly rises, and the rotor is restricted from being partly put in the oil.

In the above-described configuration, at least part of the connecting hole may be located on the second direction side in relation to an end on the second direction side of the spur gear.

With the above-described configuration, the connecting hole is located in the vicinity of the outer periphery of the spur gear. The spur gear thus readily draws oil when rotating. Also, when viewed in a direction along the central axis, at least part of the connecting hole extends beyond the spur gear. The spur gear is thus unlikely to hinder the flow of oil.

In the above-described configuration, the partition wall may be a first partition wall, and the connecting hole is a first connecting hole. The case may include a second partition wall that divides the first accommodating chamber into two spaces that are arranged in the direction along the central axis. The second partition wall may include a second connecting hole that connects the two spaces to each other. The second connecting hole may be located on the second direction side in relation to the central axis.

With the above-described configuration, although the second partition wall is provided, the second connecting hole allows oil to be discharged from the first accommodating chamber to the second accommodating chamber.

In the above-described configuration, at least part of the second connecting hole may overlap with the first connecting hole when viewed in a direction along the central axis.

With the above-described configuration, the flow of the oil discharged from the first accommodating chamber and the flow of the oil flowing into the second accommodating chamber form a substantially straight line. This is expected to allow oil to smoothly flow from the first accommodating chamber to the second accommodating chamber in the flowing direction. 100181 In the above-described configuration, the gear box may include a first drive gear that is an external gear coupled to the output shaft, a counter shaft that extends parallel to the output shaft, a first driven gear that is coupled to the counter shaft and meshes with the first drive gear, a second drive gear that is coupled to the counter shaft, and a second driven gear that serves as the spur gear meshing with the second drive gear.

With the above-described configuration, the gearbox includes two parallel shafts: the output shaft and the counter shaft. This restricts the installation space for the gearbox from being increased in the case.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A driving force transmitting device 10 according to one embodiment will now be described with reference to the drawings.

<Structure of Driving Force Transmitting Device>

Figure 1:
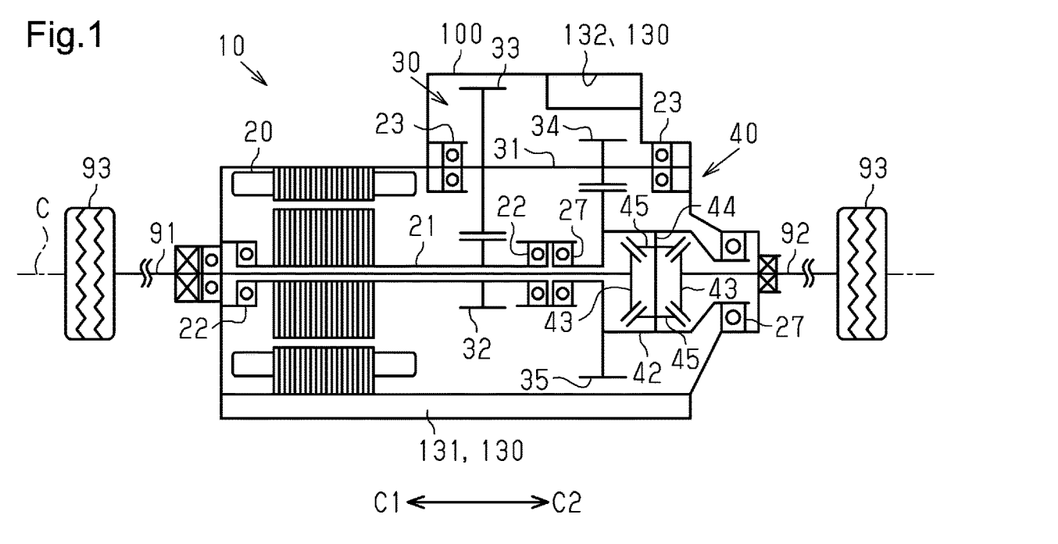
FIG. 1 is a schematic diagram of a driving force transmitting device.

As shown in FIG. 1, the driving force transmitting device 10 is mounted on a vehicle. The driving force transmitting device 10 includes a case 100 and an electric motor 20, which is located in the case 100.

The case 100 has a rectangular parallelepiped shape as a whole. A longitudinal direction of the case 100 agrees with a width direction of a vehicle on which the driving force transmitting device 10 is mounted. The case 100 includes four case members. The four case members will be discussed below. FIG. 1 illustrates the four case members collectively without differentiating them.

The electric motor 20 is a drive source of the vehicle. Although not illustrated, the electric motor 20 includes a cylindrical stator and a rotor, which is arranged inside the stator. The electric motor 20 includes an output shaft 21, which rotates integrally with the rotor. The output shaft 21 extends in the vehicle width direction. Ends of the output shaft 21 are supported by the case 100 with bearings 22. This allows the output shaft 21 to rotate relative to the case 100.

The driving force transmitting device 10 includes a gearbox 30. The gearbox 30 includes a counter shaft 31, a first drive gear 32, a first driven gear 33, a second drive gear 34, and a second driven gear 35.

The counter shaft 31 and the output shaft 21 extend parallel to each other. Ends of the counter shaft 31 are supported by the case 100 with bearings 23. This allows the counter shaft 31 to rotate relative to the case 100.

The first drive gear 32 is an external gear. The first drive gear 32 is coupled to the output shaft 21. This allows the first drive gear 32 to rotate integrally with the output shaft 21.

The first driven gear 33 is an external gear. The first driven gear 33 is coupled to the counter shaft 31. The first driven gear 33 meshes with the first drive gear 32. The outer diameter of the first driven gear 33 is larger than that of the first drive gear 32. Accordingly, the first driven gear 33 has more teeth than the first drive gear 32.

The second drive gear 34 is an external gear. The second drive gear 34 is coupled to the counter shaft 31. The outer diameter of the second drive gear 34 is smaller than that of the first driven gear 33. Accordingly, the second drive gear 34 has fewer teeth than the first driven gear 33.

The second driven gear 35 is an external spur gear. The second driven gear 35 is coaxial with the output shaft 21. The second driven gear 35 meshes with the second drive gear 34. The outer diameter of the second driven gear 35 is larger than that of the second drive gear 34. Accordingly, the second driven gear 35 has more teeth than the second drive gear 34.

When rotation of the output shaft 21 is transmitted to the counter shaft 31 in the above gearbox 30, the number of rotations is reduced in correspondence with the relationship between the number of teeth of the first drive gear 32 and the number of teeth of the first driven gear 33. When rotation of the counter shaft 31 is transmitted to the second driven gear 35, the number of rotations is reduced in correspondence with the relationship between the number of teeth of the second drive gear 34 and the number of teeth of the second driven gear 35. That is, the gearbox 30 is a mechanism that changes the rotation speed of the output shaft 21.

The driving force transmitting device 10 includes a differential mechanism 40. The differential mechanism 40 includes a differential case 42, a pair of side gears 43, a pinion shaft 44, and a pair of pinion gears 45.

The differential case 42 is cylindrical. The differential case 42 is coupled to the second driven gear 35. A central axis of the differential case 42 agrees with a rotation central axis of the second driven gear 35. The differential case 42 rotates integrally with the second driven gear 35. The differential case 42 is supported by the case 100 with bearings 27. This allows the differential case 42 to rotate relative to the case 100.

The side gears 43 are located inside the differential case 42. The side gears 43 are bevel gears. The side gears 43 face each other.

The pinion shaft 44 is located inside the differential case 42. The pinion shaft 44 is located between the side gears 43.

The pinion shaft 44 is substantially rod-shaped. The pinion shaft 44 is coupled to the differential case 42.

The pinion gears 45 are located inside the differential case 42. A rotation center of the pinion gears 45 agrees with a central axis of the pinion shaft 44. The pinion gears 45 face each other. The pinion gears 45 are located between the side gears 43. The pinion gears 45 mesh with both the side gears 43.

The vehicle includes a first axle 91, a second axle 92, and two wheels 93. A first end of the first axle 91 is connected to one of the wheels 93. A second end of the first axle 91 is coupled to one of the side gears 43. The first axle 91 is driven and rotated by the side gear 43 so as to rotate the wheel 93.

A first end of the second axle 92 is connected to the other wheel 93. A second end of the second axle 92 is connected to the side gear 43. The second axle 92 is driven and rotated by the other side gear 43 so as to rotate the wheel 93.

As described above, the differential mechanism 40 receives torque from the electric motor 20 via the gearbox 30 and transmits the torque to the wheels 93. The differential mechanism 40 allows the rotation speeds of the wheels 93 to differ from each other.

Case

Figure 2:
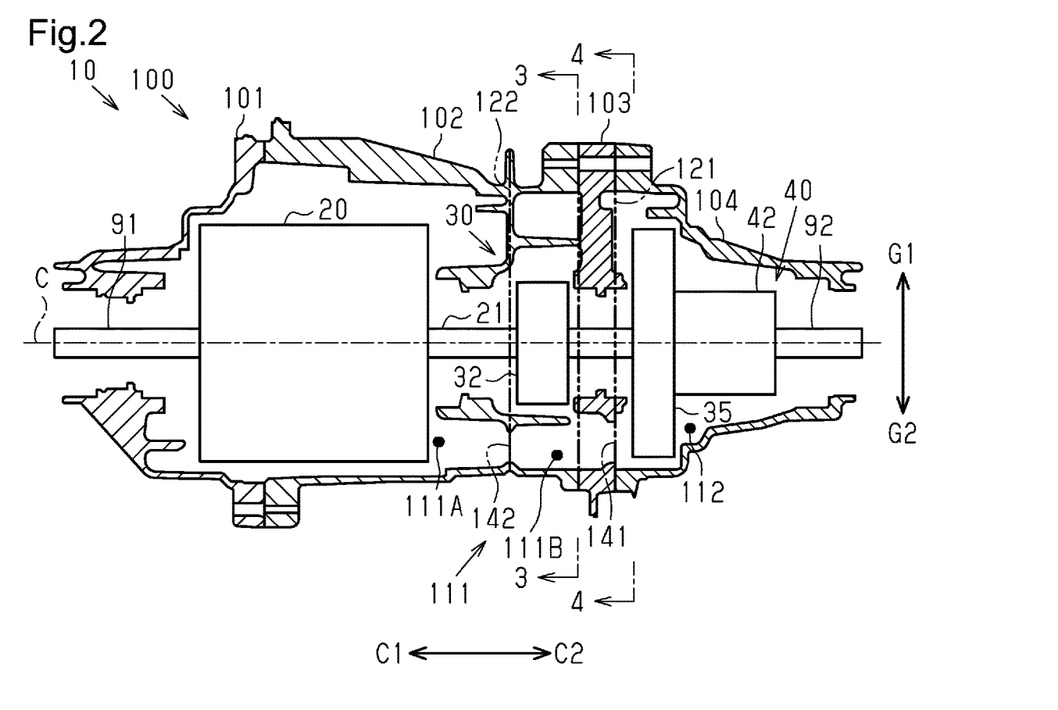
FIG. 2 is a cross-sectional view of a case including a central axis.

As shown in FIG. 2, the case 100 includes four case members: a first case member 101, a second case member 102, a third case member 103, and a fourth case member 104. The first case member 101 to the fourth case member 104 are arranged in order in a direction along a central axis C of the output shaft 21. One of two directions along the central axis C will hereafter be referred to as a positive direction C1, and a direction opposite to the positive direction C1 will be referred to as a negative direction C2. An axis orthogonal to the central axis C is defined as the orthogonal axis. A specific direction along the orthogonal axis is defined as an upward direction GI. A direction opposite to the upward direction GI is defined as a downward direction G2.

As shown in FIG. 2, the first case member 101 is cylindrical as a whole. The first case member 101 accommodates part of the electric motor 20. The electric motor 20, the gears in the gearbox 30, and the differential mechanism 40 are simplified in FIG. 2. An end in the positive direction C1 of the first case member 101 is an end in the positive direction C1 of the case 100. An end in the negative direction C2 of the first case member 101 is connected to an end in the positive direction C1 of the second case member 102.

The second case member 102 is cylindrical as a whole. The second case member 102 accommodates part of the electric motor 20, the first drive gear 32, and the first driven gear 33. An end in the negative direction C2 of the second case member 102 is connected to an end in the positive direction C1 of the third case member 103.

The third case member 103 is cylindrical as a whole. The third case member 103 accommodates the bearings 22 and other components. The bearings are omitted in FIG. 2. An end in the negative direction C2 of the third case member 103 is connected to an end in the positive direction C1 of the fourth case member 104.

The fourth case member 104 is cylindrical as a whole. The fourth case member 104 accommodates the second drive gear 34, the second driven gear 35, and the differential mechanism 40. An end in the negative direction C2 of the fourth case member 104 is an end in the negative direction C2 of the case 100.

Figure 4:
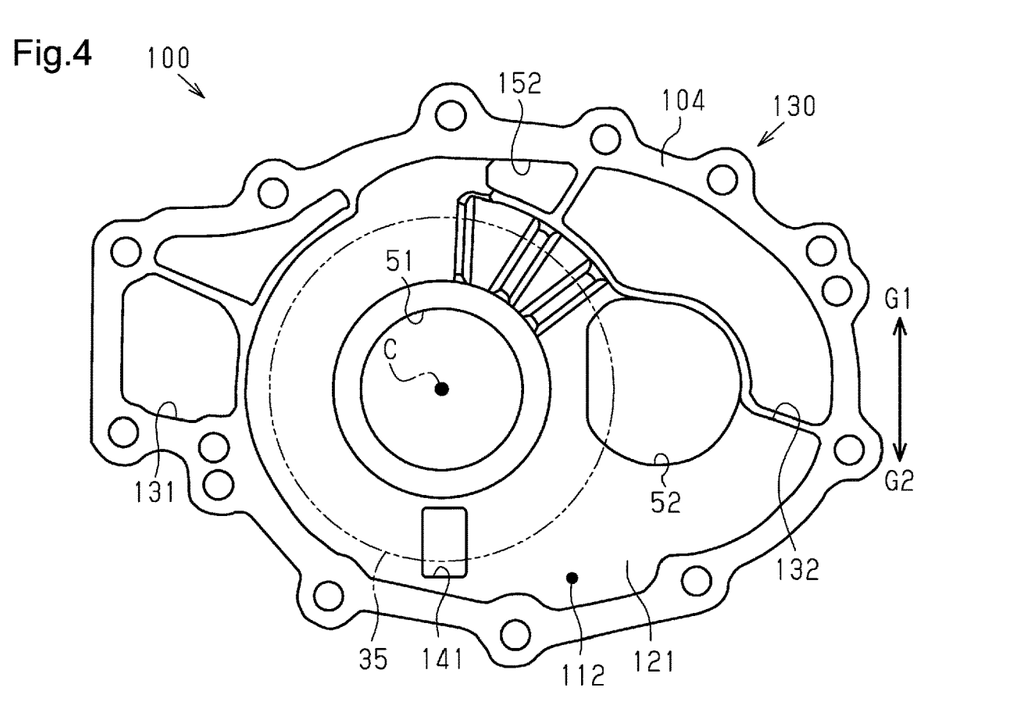
FIG. 4 is a cross-sectional view taken along line 4-4 in FIG. 3.

The case 100 includes a first partition wall 121, a first accommodating chamber 111, and a second accommodating chamber 112. The first accommodating chamber 111 and the second accommodating chamber 112 are separated from each other by the first partition wall 121. Specifically, the third case member 103 includes the first partition wall 121 as shown in FIG. 4. The first partition wall 121 is substantially a flat plate-shaped wall. The first partition wall 121 has a principal surface, which is orthogonal to the central axis C. A principal surface refers to the largest one of the outer surfaces of a plate-shaped object.

As shown in FIG. 2, the first partition wall 121 divides the internal space of the case 100 into the first accommodating chamber 111, which is located on the positive direction C1 side, and the second accommodating chamber 112, which is located on the negative direction C2 side. The first accommodating chamber 111 is thus a space defined by the first case member 101, the second case member 102, and the third case member 103. The second accommodating chamber 112 is a space defined by the third case member 103 and the fourth case member 104. The first accommodating chamber 111 and the second accommodating chamber 112 arranged in a direction along the central axis C with the first partition wall 121 between them.

As shown in FIG. 4, the first partition wall 121 includes a hole 51, into which the output shaft 21 is inserted, and a hole 52, into which the counter shaft 31 is inserted. The output shaft 21 and the counter shaft 31 extend through the first partition wall 121.

Figure 3:
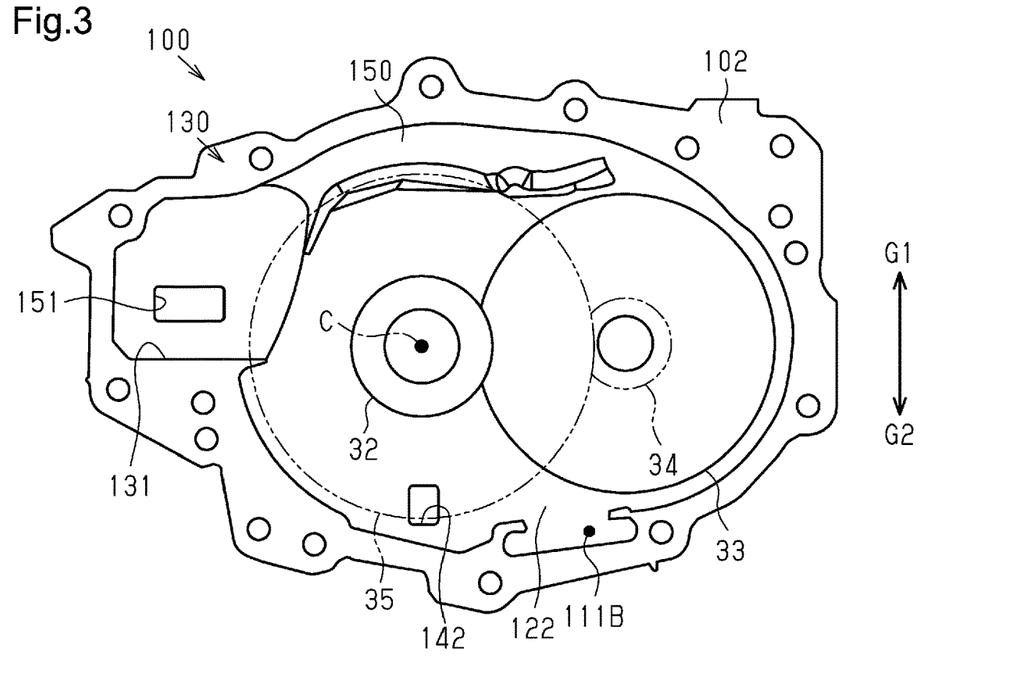
FIG. 3 is a cross-sectional view taken along line 3-3 in FIG. 2.

As shown in FIG. 3, the case 100 further includes a second partition wall 122. The second partition wall 122 is substantially a flat plate-shaped wall. The second partition wall 122 has a principal surface, which is orthogonal to the central axis C. As shown in FIG. 2, the second partition wall 122 is located halfway in the direction along the central axis C in the second case member 102. The second partition wall 122 divides the first accommodating chamber 111 into a first space 111A, which is located on the positive direction C1 side, and a second space 111B, which is located on the negative direction C2 side. The first space 111A and the second space 111B are arranged in a direction along the central axis C with the second partition wall 122 between them.

Although not illustrated in FIG. 3, the second partition wall 122 includes a hole into which the output shaft 21 is inserted and a hole into which the counter shaft 31 is inserted. The holes of the second partition wall 122 respectively face the hole 51 and the hole 52 of the first partition wall 121 in a direction along the central axis C. The output shaft 21 and the counter shaft 31 extend through the second partition wall 122.

Among the components accommodated in the case 100, the electric motor 20 is located in the first space 111A of the first accommodating chamber 111 as shown in FIG. 2. The first drive gear 32 and the first driven gear 33 of the gearbox 30 is located in the second space 111B of the first accommodating chamber 111. The second drive gear 34 and the second driven gear 35 of the gearbox 30 are located in the second accommodating chamber 112.

As shown in FIGS. 3 and 4, the case 100 includes a catch tank 130. Further, the catch tank 130 includes a first tank 131, a second tank 132, and a connecting passage 150.

The first tank 131 is a space defined in the second case member 102, the third case member 103, and the fourth case member 104. The first tank 131 is divided into the second space 111B and the second accommodating chamber 112 by a wall. Most of the first tank 131 is located on the upward direction G1 side in relation to the central axis C.

As shown in FIG. 3, the first tank 131 is connected to the first space 111A by a first through-hole 151. The first through-hole 151 extends through the second partition wall 122. The first through-hole 151 is located on the upward direction G1 side in relation to the central axis C.

The first tank 131 is connected to the second space 111B by the connecting passage 150. The connecting passage 150 is located on the upward direction G1 side in relation to the second space 111B. Therefore, oil that is raised by rotation of components such as the first driven gear 33, which is located in the second space 111B, flows into the first tank 131 through the connecting passage 150.

As shown in FIGS. 3 and 4, the connecting passage 150 is connected to the second accommodating chamber 112 by the second through-hole 152. The second through-hole 152 is a return passage that is connected to both of the first accommodating chamber 111 and the second accommodating chamber 112. As shown in FIG. 4, the second through-hole 152 extends through the first partition wall 121. In correspondence with the position of the connecting passage 150, the second through-hole 152 is located on the upward direction G1 side in relation to the second accommodating chamber 112. Also, the second through-hole 152 is located on the upward direction G1 side in relation to the central axis C.

As described above, the first tank 131 and the connecting passage 150 connect the first space 111A of the first accommodating chamber 111 and the second accommodating chamber 112 to each other via the first through-hole 151 and the second through-hole 152.

As shown in FIG. 4, the second tank 132 is a space defined in the third case member 103 and the fourth case member 104. The second tank 132 is separated from the second accommodating chamber 112 by a wall. Although not illustrated, the second tank 132 is connected to the second accommodating chamber 112. The second tank 132 is connected to the connecting passage 150 by the second through-hole 152. Therefore, some of the oil that is raised by rotation of components such as the second driven gear 35, which is located in the second accommodating chamber 112, flows into the second tank 132. Also, some of the oil that is raised by rotation of components such as the second driven gear 35 flows into the first tank 131 through the second through-hole 152 and the connecting passage 150.

As shown in FIG. 2, the first partition wall 121 includes a first connecting hole 141, which extends through the first partition wall 121. The first connecting hole 141 is located on the downward direction G2 side in relation to the central axis C. As shown in FIG. 4, the first connecting hole 141 is located on the downward direction G2 side in relation to the lower end of the first tank 131. Further, the first connecting hole 141 is located directly below the central axis C.

The first connecting hole 141 has a substantially rectangular shape when viewed in a direction along the central axis C. A part on the upward direction G1 side of the first connecting hole 141 overlaps with the second driven gear 35 when viewed in a direction along the central axis C. A part on the downward direction G2 side of the first connecting hole 141 is located on a side in the downward direction G2 in relation to the end on the downward direction G2 side of the second driven gear 35. That is, the part on the downward direction G2 side of the first connecting hole 141 extends beyond the second driven gear 35. The first connecting hole 141 allows oil to flow from the second space 111B of the first accommodating chamber 111 to the second accommodating chamber 112. In FIG. 4, the position of the second driven gear 35 illustrated hypothetically.

As shown in FIG. 2, the second partition wall 122 includes a second connecting hole 142. The second connecting hole 142 is located on the downward direction G2 side in relation to the central axis C. As shown in FIG. 3, the second connecting hole 142 is located on the downward direction G2 side in relation to the lower end of the first tank 131. Further, the second connecting hole 142 is located directly below the central axis C. The second connecting hole 142 has a substantially rectangular shape when viewed in a direction along the central axis C. The opening area of the second connecting hole 142 is smaller than that of the first connecting hole 141.

When viewed in a direction along the central axis C, the second connecting hole 142 overlaps with the first connecting hole 141 as shown in FIGS. 3 and 4. In the present embodiment, the center of the first connecting hole 141 is substantially the same as the second connecting hole 142. Accordingly, the second connecting hole 142 entirely overlaps with the first connecting hole 141. The second connecting hole 142 allows oil to flow from the first space 111A to the second space 111B of the first accommodating chamber 111.

Operation of Present Embodiment

When the electric motor 20 is driven, torque is transmitted from the electric motor 20 to the second driven gear 35. When the second driven gear 35 is viewed in the positive direction C1, the second driven gear 35 rotates clockwise. Rotation of the second driven gear 35 raises the oil stored in the second accommodating chamber 112. Some of the raised oil flows through the second through-hole 152, which is located in the upward direction G1 in relation to the second driven gear 35. The oil that has flowed through the second through-hole 152 flows into the connecting passage 150, which is located in the second space 111B of the first accommodating chamber 111. Some of the raised oil which does not flow into the second through-hole 152 is conducted to the second tank 132.

The oil in the second space 111B is raised by rotation of the first driven gear 33. Some of the raised oil flows into the connecting passage 150, which is located on the upward direction G1 side in relation to the first driven gear 33.

The oil that flows through the connecting passage 150 is conducted to the first tank 131. The oil in the first tank 131 flows out to the first space 111A via the first through-hole 151. In this manner, the oil in the second accommodating chamber 112 and the second space 111B flows to the first space 111A of the first accommodating chamber 111 when the electric motor 20 is driven.

Figure 5:
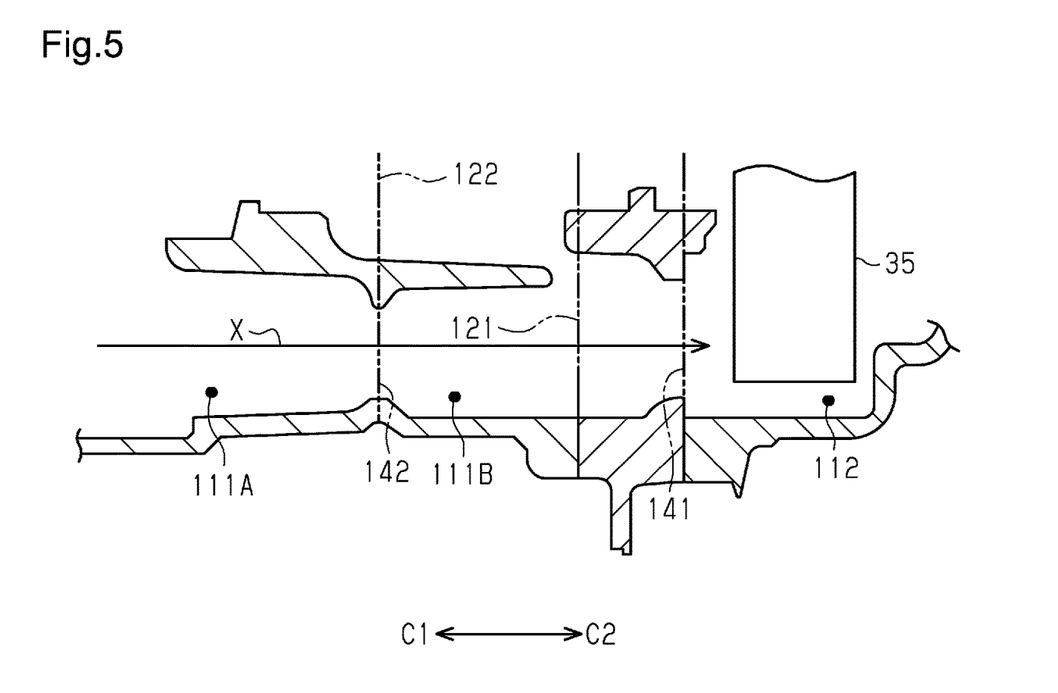
FIG. 5 is a partially enlarged view of the case.

As indicated by arrow X in FIG. 5, the oil stored in the first space 111A flows in the first space 111A through the second connecting hole 142, which is located on the downward direction G2 side in relation to the central axis C. The oil that has flowed through the second connecting hole 142 flows into the second space 111B. Also, the oil in the second space 111B flows through the first connecting hole 141, which is located on the downward direction G2 side in relation to the central axis C. The oil that has flowed through the first connecting hole 141 flows into the second accommodating chamber 112.

Advantages of Present Embodiment (1) When rotating, the second driven gear 35 raises oil in the vicinity of the second driven gear 35. Accordingly, oil is likely to be drawn toward the second driven gear 35 in the area surrounding the outer periphery of the second driven gear 35.

In the above-described embodiment, the first connecting hole 141 is arranged to overlap with the second driven gear 35. Thus, oil is likely to flow from the first connecting hole 141 toward the second driven gear 35. In other words, the oil in the first accommodating chamber 111 is likely to flow into the second accommodating chamber 112 through the first connecting hole 141 and the second connecting hole 142. This flow of the oil restricts the oil from stagnating in the first accommodating chamber 111. Since oil is unlikely to stagnate in the first accommodating chamber 111, the oil level in the first accommodating chamber 111 is unlikely to rise. The rotor of the electric motor 20 is thus unlikely to be put in the oil.

(2) In the above-described embodiment, a part on the downward direction G2 side of the first connecting hole 141 is located on the downward direction G2 side in relation to the end on the downward direction G2 side of the second driven gear 35. With this configuration, the first connecting hole 141 is located in the vicinity of the outer periphery of the second driven gear 35. The second driven gear 35 thus readily draws oil when rotating. Also, when viewed in a direction along the central axis C, a part in the downward direction G2 of the first connecting hole 141 extends beyond the second driven gear 35. The second driven gear 35 is thus unlikely to hinder the flow of oil.

(3) In the above-described embodiment, the second partition wall 122 includes the second connecting hole 142. The second connecting hole 142 is located on the downward direction G2 side in relation to the central axis C. Although the first accommodating chamber 111 is divided into two spaces by the second partition wall 122 as in the above-described embodiment, the second connecting hole 142 allows oil to flow from the first accommodating chamber 111 to the second accommodating chamber 112. In the first accommodating chamber 111, oil can be conducted from the first space 111A to the second space 111B. This readily restricts the oil from stagnating in the first space 111A.

(4) In the above-described embodiment, when viewed in a direction along the central axis C, the second connecting hole 142 overlaps with the first connecting hole 141. With this configuration, the flow of the oil discharged from the first accommodating chamber 111 and the flow of the oil flowing into the second accommodating chamber 112 substantially form a straight line. This is expected to allow oil to smoothly flow from the first accommodating chamber 111 to the second accommodating chamber 112 in the flowing direction.

(5) In the above-described embodiment, the gearbox 30 includes the first drive gear 32, which is coupled to the output shaft 21, the counter shaft 31, the first driven gear 33, and the second drive gear 34. With this configuration, the gearbox 30 includes two parallel shafts: the output shaft 21 and the counter shaft 31. This restricts the installation space for the gearbox 30 from being increased in the case 100.

Modifications

The above-described embodiment may be modified as follows. The above-described embodiment and the following modifications can be combined as long as the combined modifications remain technically consistent with each other.

The configuration of the shafts and gears of the gearbox 30 is not limited to that described in the above-described embodiment. The technique related to the first connecting hole 141 is applicable as long as the gearbox 30 includes a spur gear that is accommodated in the second accommodating chamber 112. For example, in addition to the counter shaft 31, the gearbox 30 may include a second counter shaft that extends parallel to the output shaft 21. This configuration requires only a drive gear and a driven gear for rotating the second counter shaft. In this case, an appropriate design change would be needed, taking into consideration the gear ratio with which the gearbox 30 is desired to operate and the installation space for the gearbox 30.

The configuration of the shafts and gears of the differential mechanism 40 is not limited to that described in the above-described embodiment. The present disclosure can be employed in any configuration as long as the differential mechanism 40 receives torque from the electric motor 20 via the gearbox 30 and transmits the torque to the wheels 93.

In the above-described embodiment, the case 100 does not necessarily need to include the second partition wall 122. Even if the second partition wall 122 is not provided, oil can flow from the first accommodating chamber 111 to the second accommodating chamber 112 as long as the first partition wall 121 includes the first connecting hole 141.

In the above-described embodiment, the shape of the first connecting hole 141 may be changed. That is, when viewed in a direction along the central axis C, the first connecting hole 141 may have a polygonal shape other than a rectangular shape. Alternatively, the first connecting hole 141 may have a circular or elliptic shape. In short, the first connecting hole 141 may have any shape as long as oil can flow through it. The same applies to the second connecting hole 142.

The above-described embodiment may include multiple first connecting holes 141. When multiple first connecting hole 141 are provided, the first connecting holes 141 do not necessarily need to have the same shape. The same applies to the second connecting hole 142. The number of the first connecting holes 141 and the number of the second connecting holes 142 do not necessarily need to agree with each other.

In the above-described embodiment, the position of the first connecting hole 141 may be changed as long as it is located on the downward direction G2 side in relation to the central axis C. For example, the entire first connecting hole 141 may be located on the upward direction G1 side in relation to the end on the downward direction G2 side of the second driven gear 35. Further, the first connecting hole 141 does not necessarily need to be located directly below the central axis C.

The arrangement of the second connecting hole 142 in the second partition wall 122 is not limited to that in the above-described embodiment. That is, when viewed in a direction along the central axis C, the second connecting hole 142 does not necessarily need to be arranged to overlap with the first connecting hole 141.

In the above-described embodiment, the case 100 may be divided into more than or less than four case members.

In the above-described embodiment, the case 100 may include an additional partition wall that further divides the first accommodating chamber 111 or the second accommodating chamber 112. For example, an additional partition wall may be provided between, in the direction along the central axis C, the first accommodating chamber 111, which accommodates the electric motor 20, and the second accommodating chamber 112, which accommodates the second driven gear 35. In this case, the additional partition wall needs to have a connecting hole that connects the separated spaces to each other.

In the above-described embodiment, the second through-hole 152, which is part of the catch tank 130, serves as a return passage. However, another return passage may be provided in addition to or in place of the second through-hole 152. For example, the first partition wall 121 may be provided with an additional hole that serves as a return passage, and the additional hole may be located on the upward direction G1 side in relation to the central axis C. Even in this case, oil in the second accommodating chamber 112 is raised by rotation of components such as the second driven gear 35 and the like, and the raised oil is returned to the first accommodating chamber 111 through the additional hole.

The interior of the bearings supporting the output shaft 21 may serve as a return passage. For example, the bearings that support the output shaft 21 are respectively fitted to the first partition wall 121 and the second partition wall 122. These bearings have slight gaps in them. This configuration allows oil to circulate between opposite sides of each partition wall. Accordingly, the interior of each bearing can be used as a return passage by selecting the type of bearing and adjusting the dimensions of the bearing.

The configuration of the catch tank 130 is not limited to that described in the above-described embodiment. For example, the catch tank 130 does not necessarily need to be connected to both of the first accommodating chamber 111 and the second accommodating chamber 112, but may be connected to only one of the first accommodating chamber 111 and the second accommodating chamber 112. This modification also allows the catch tank 130 to temporarily store oil. In this case, a return passage needs to be provided separately from the catch tank 130 as in the above example.

Further, the catch tank 130 may be omitted in the above-described embodiment. This configuration simply requires another return passage.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A driving force transmitting device, comprising:
a case;
an electric motor that is located in the case and includes an output shaft; and
a gearbox that is located in the case and configured to change a rotation speed of the output shaft, wherein
the gearbox includes gears, one of which is a spur gear, the spur gear rotating coaxially with the output shaft,
the case includes:
a first accommodating chamber that accommodates the electric motor;
a second accommodating chamber that accommodates the spur gear, the first accommodating chamber and the second accommodating chamber being arranged in a direction along a central axis of the output shaft,
a partition wall that separates the first accommodating chamber and the second accommodating chamber from each other; and
a return passage,
an axis that is orthogonal to the central axis is referred to as an orthogonal axis,
one of two directions along the orthogonal axis is referred to as a first direction, and a direction opposite to the first direction is referred to as a second direction,
at least part of the return passage is located on the first direction side in relation to the central axis,
the return passage is connected to both of the first accommodating chamber and the second accommodating chamber,
the partition wall includes a connecting hole that connects the first accommodating chamber and the second accommodating chamber to each other,
the connecting hole is located on the second direction side in relation to the central axis, and
at least part of the connecting hole overlaps with the spur gear when viewed in a direction along the central axis,
wherein the partition wall is a first partition wall, and the connecting hole is a first connecting hole,
the case includes a second partition wall that divides the first accommodating chamber into two spaces that are arranged in the direction along the central axis,
the second partition wall includes a second connecting hole that connects the two spaces to each other, and
the second connecting hole is located on the second direction side in relation to the central axis.

2. The driving force transmitting device according to claim 1, wherein at least part of the connecting hole extends, in the second direction, beyond the spur gear.

3. The driving force transmitting device according to claim 1, wherein at least part of the second connecting hole overlaps with the first connecting hole when viewed in a direction along the central axis.

4. A driving force transmitting device, comprising:
a case;
an electric motor that is located in the case and includes an output shaft; and
a gearbox that is located in the case and configured to change a rotation speed of the output shaft, wherein
the gearbox includes gears, one of which is a spur gear, the spur gear rotating coaxially with the output shaft,
the case includes:
a first accommodating chamber that accommodates the electric motor;
a second accommodating chamber that accommodates the spur gear, the first accommodating chamber and the second accommodating chamber being arranged in a direction along a central axis of the output shaft,
a partition wall that separates the first accommodating chamber and the second accommodating chamber from each other; and
a return passage,
an axis that is orthogonal to the central axis is referred to as an orthogonal axis,
one of two directions along the orthogonal axis is referred to as a first direction, and a direction opposite to the first direction is referred to as a second direction,
at least part of the return passage is located on the first direction side in relation to the central axis,
the return passage is connected to both of the first accommodating chamber and the second accommodating chamber, the partition wall includes a connecting hole that connects the first accommodating chamber and the second accommodating chamber to each other, the connecting hole is located on the second direction side in relation to the central axis, and at least part of the connecting hole overlaps with the spur gear when viewed in a direction along the central axis, wherein the gear box includes:

a first drive gear that is an external gear coupled to the output shaft;

a counter shaft that extends parallel to the output shaft;

a first driven gear that is coupled to the counter shaft and meshes with the first drive gear;

a second drive gear that is coupled to the counter shaft; and a second driven gear that serves as the spur gear, wherein the spur gear meshes with the second drive gear.

\* \* \* \* \*